(12) United States Patent
Ballan et al.

(10) Patent No.: US 10,168,802 B2
(45) Date of Patent: Jan. 1, 2019

(54) ACTIVE PEN WITH TIP PRESSURE SENSOR

(71) Applicant: Advanced Silicon SA, Lausanne (CH)

(72) Inventors: Hussein Ballan, St-Legier (CH); Paolo Cella, Yverdon-les-Bains (CH); Jean-Daniel Carrard, Yverdon-les-Bains (CA); Marc Pastre, St-Sulpice (CH); Tristan Reimann, Lonay (CH)

(73) Assignee: Advanced Silicon SA (CH)

( * ) Notice: Subject to any disclaimer, the term of this patent is extended or adjusted under 35 U.S.C. 154(b) by 306 days.

(21) Appl. No.: 14/916,144

(22) PCT Filed: Jun. 25, 2015

(86) PCT No.: PCT/EP2015/064442
§ 371 (c)(1),
(2) Date: Mar. 2, 2016

(87) PCT Pub. No.: WO2015/158931
PCT Pub. Date: Oct. 22, 2015

(65) Prior Publication Data
US 2016/0239112 A1    Aug. 18, 2016

(30) Foreign Application Priority Data
Feb. 13, 2015  (SE) ..................................... 00195/15

(51) Int. Cl.
*G06F 3/044*     (2006.01)
*G06F 3/0354*    (2013.01)
(Continued)

(52) U.S. Cl.
CPC ........ *G06F 3/03545* (2013.01); *G06F 3/0383* (2013.01); *G06F 3/044* (2013.01); *G06F 3/0414* (2013.01)

(58) Field of Classification Search
CPC .. G06F 3/03545; G06F 3/0383; G06F 3/0414; G06F 3/044
See application file for complete search history.

(56) References Cited

U.S. PATENT DOCUMENTS 5,751,274 A * 5/1998 Davis ....................... G05G 1/30
345/157
8,913,041 B2  12/2014 Fukushima et al.
(Continued)

FOREIGN PATENT DOCUMENTS

CN   102192760 A   9/2011
EP    2187288 A2   5/2010
(Continued)

OTHER PUBLICATIONS

International Search Report and Written Opinion for PCT/EP2015/064442, dated Oct. 20, 2015, 11 pages.

*Primary Examiner* — Ram A Mistry
(74) *Attorney, Agent, or Firm* — Blank Rome LLP

(57) ABSTRACT

Active position indicator comprising a movable tip element (10) configured to be displaced from an initial position in a displacement direction by a tip displacement depending on the force acting on a tip (3) arranged on a distal end of the tip element (10); a force sensor for detecting a force acting on the tip (3) comprising an elastic element acting on the tip element (10) against the tip displacement; wherein the elastic element is a leaf spring (15).

21 Claims, 5 Drawing Sheets

(51) Int. Cl.
*G06F 3/038* (2013.01)
*G06F 3/041* (2006.01)

(56) References Cited

U.S. PATENT DOCUMENTS

| | | | |
|---|---|---|---|
| 9,335,840 B1* | 5/2016 | Chou | G06F 3/0383 |
| 9,711,303 B2* | 7/2017 | Chen | H01H 13/85 |
| 2007/0195068 A1 | 8/2007 | Kable et al. | |
| 2011/0192658 A1* | 8/2011 | Fukushima | G06F 3/03545 |
| | | | 178/19.03 |
| 2011/0219892 A1 | 9/2011 | Fukushima et al. | |
| 2013/0141398 A1* | 6/2013 | Cho | G06F 3/03545 |
| | | | 345/179 |
| 2013/0321359 A1 | 12/2013 | Zeliff et al. | |
| 2016/0018912 A1 | 1/2016 | Kaneda et al. | |

FOREIGN PATENT DOCUMENTS

| | | |
|---|---|---|
| JP | H0587634 U | 11/1993 |
| JP | H0741633 U | 7/1995 |
| JP | 2011186803 A | 9/2011 |
| JP | 2015026359 A | 2/2015 |
| WO | WO-03/069547 A1 | 8/2003 |
| WO | WO-2014/174123 A2 | 10/2014 |

\* cited by examiner

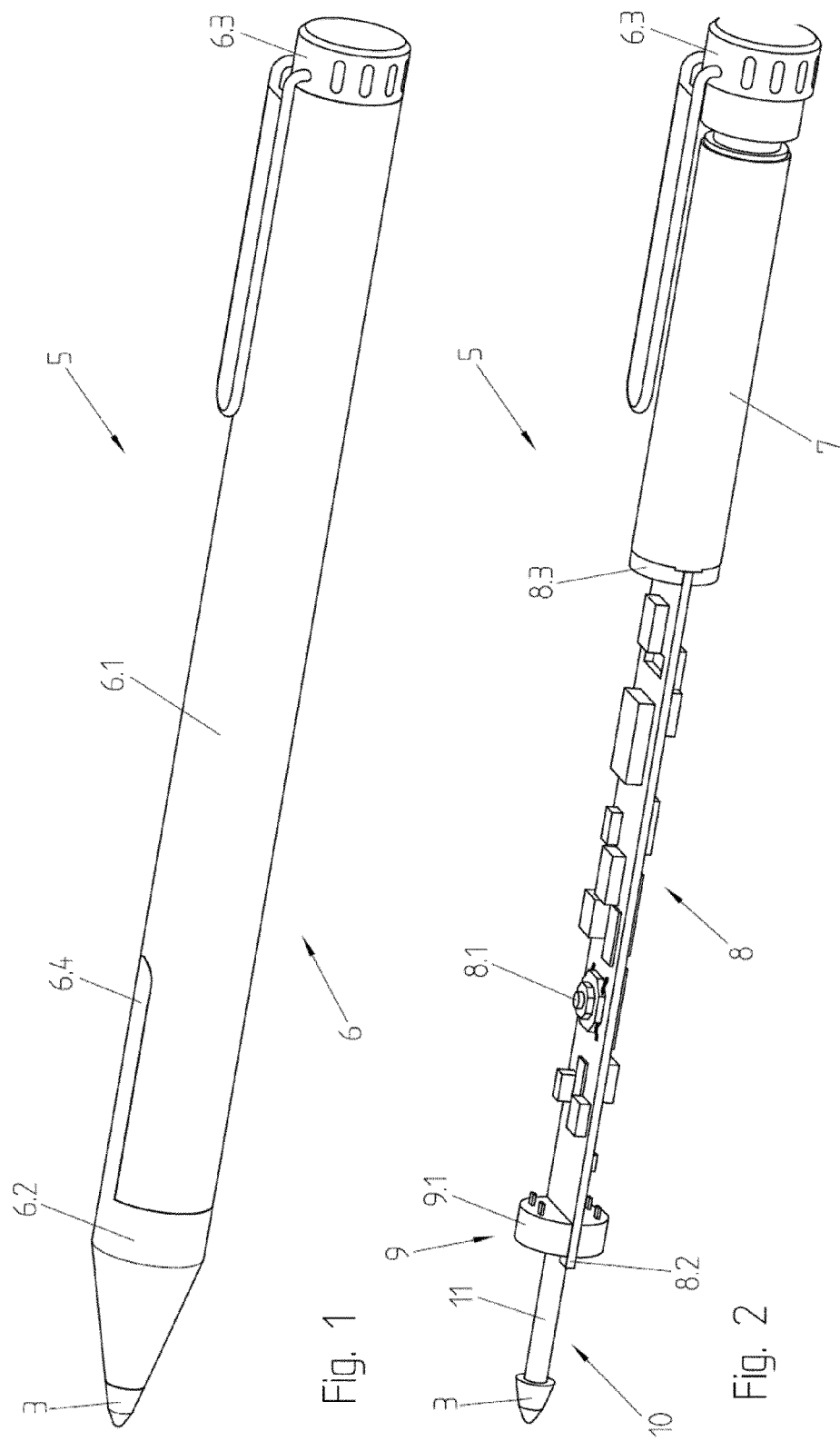

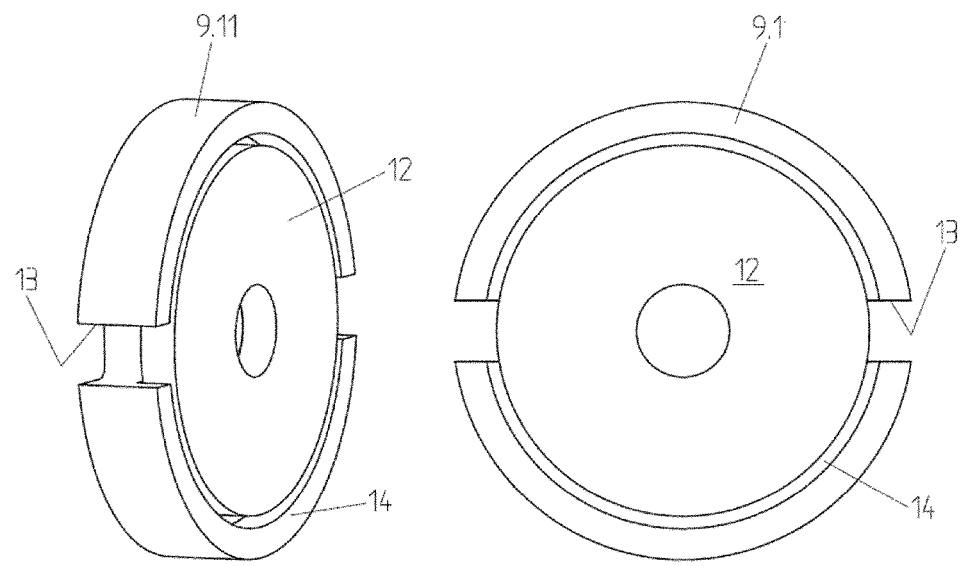
Fig. 7   Fig. 8
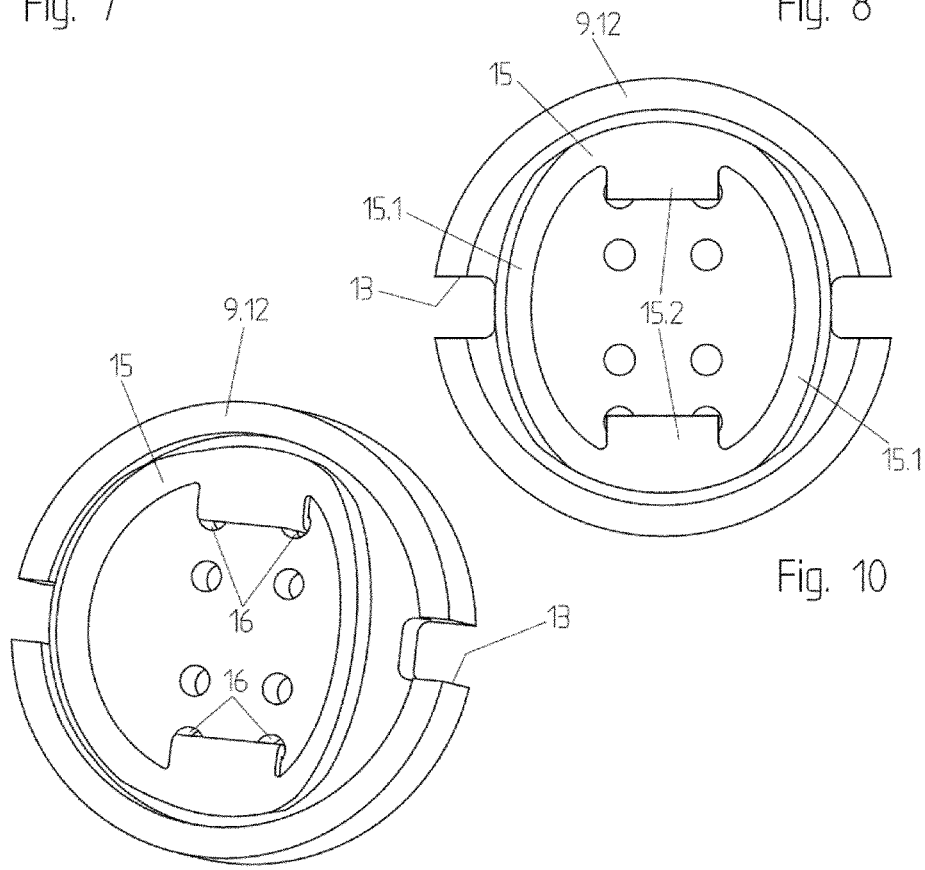
Fig. 10
Fig. 9

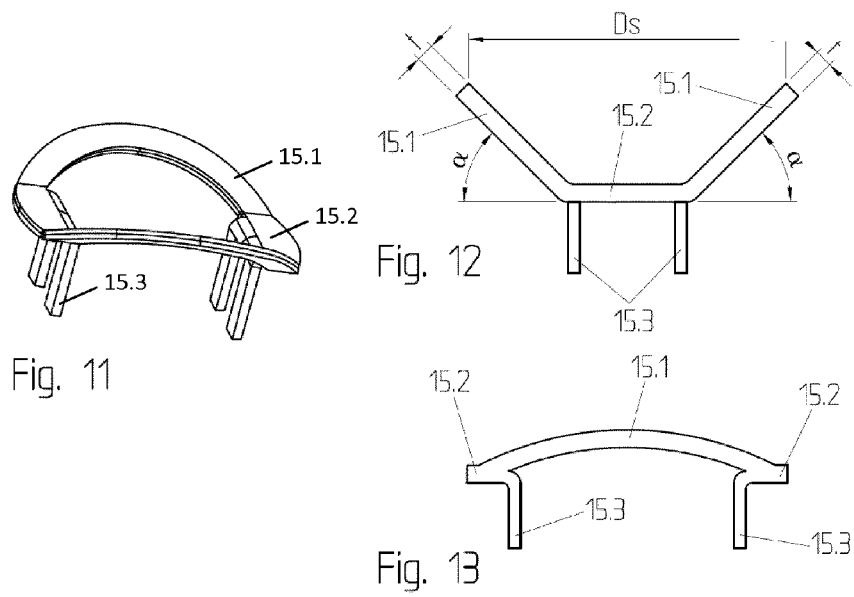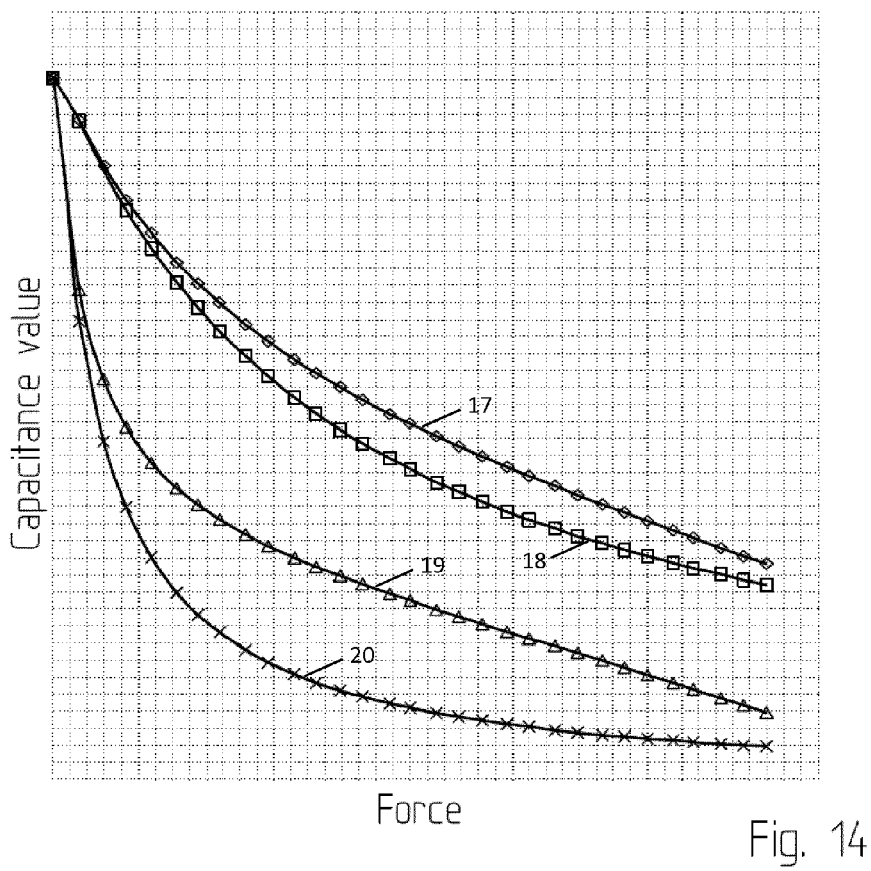

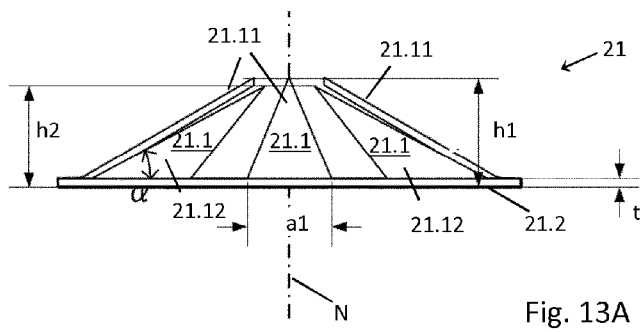
Fig. 13A
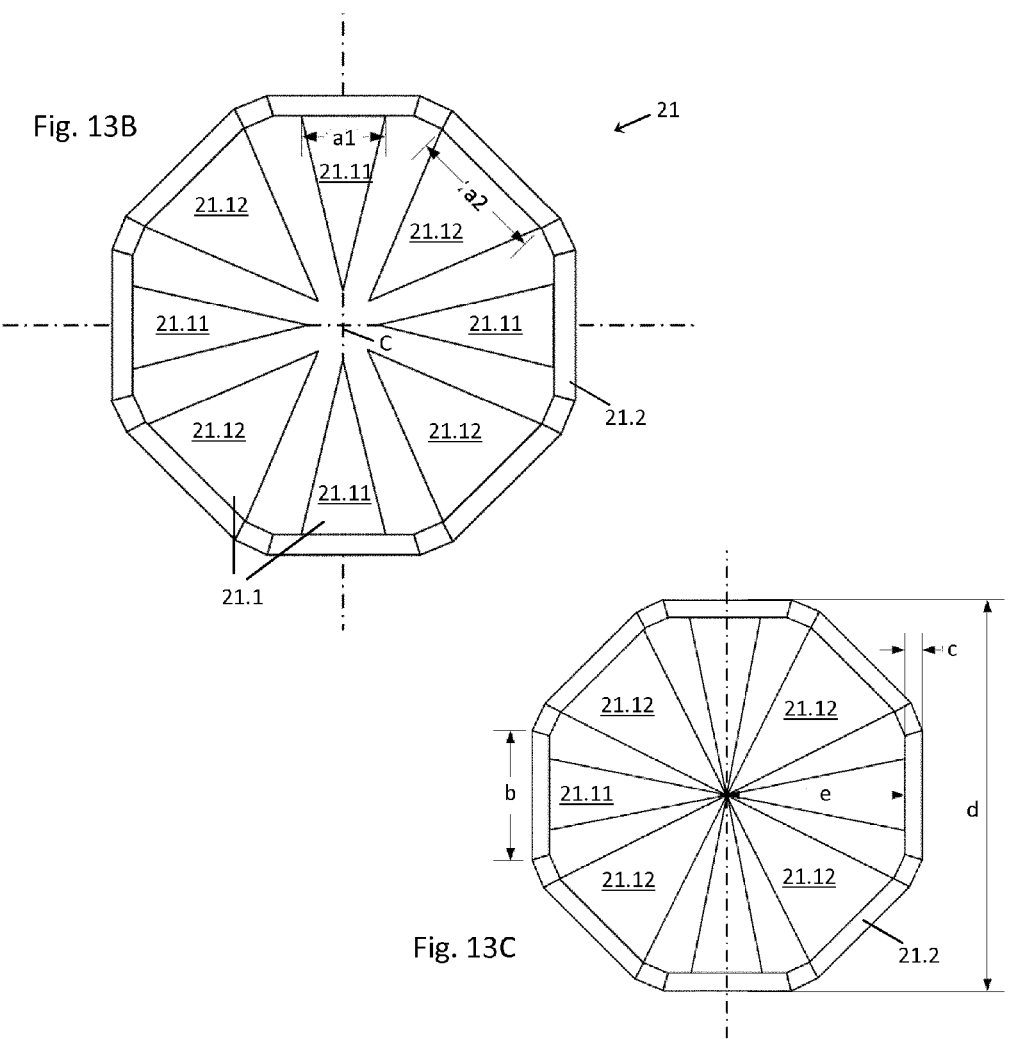
Fig. 13B
Fig. 13C

ACTIVE PEN WITH TIP PRESSURE SENSOR

RELATED APPLICATIONS

This application is a national phase of PCT/EP2015/064442, filed on Jun. 25, 2015, which claims the benefit of Switzerland Application No. 00195/15, filed on Feb. 13, 2015. The entire contents of those applications are incorporated herein by reference.

FIELD OF THE INVENTION

The present invention concerns an active position indicator, in particular active pens, with a pressure sensor.

DESCRIPTION OF RELATED ART

Touch devices are used in various application fields in which object presence detections are involved, such as, but not limited to, touch pads, touch panels, touch screens or projective capacitive displays. Touch devices detect passive objects touching the touch device and can determine the position of the touch. This allows for example a user control. Unfortunately, the quality of the position detection of touches reduces with the size of the touched surface. Therefore, the quality of the position detection of a tip of a pen can only detected with a high detection error. Therefore, active position indicators, like active pens, contain electric circuits supporting a touch device to detect the position of the active position indicator with a lower error. This could be for example achieved by a capacitive or inductive coupling. When using certain touch devices, e.g. capacitive or inductive touch devices, the same sensors for detecting a passive touch could be used for detecting the electric signal emitted from the tip of the active position indicator. There are different types of active position indicators. There are active position indicators synchronizing an emission of the electric signal with a certain active position indicator detection window. There are other active position indicators with a continuous emission of the electric signal, i.e. without any synchronisation in the active position indicator to the touch device. There are active position indicators operated with a battery or with an energy harvesting apparatus for winning energy from the ambience. There are also active position indicators without an own power supply operated like a transponder gaining the necessary power for operation from the transponder signal. WO2014/174123 shows an example for a capacitive touch device with a continuously emitting active position indicator, wherein the capacitive touch device uses the same capacitive detection sensors for detecting a passive and an active touch.

Another problem for a good detection of written interactions with touch devices is the knowledge of the pressure applied by the pen. There are some touch devices which can detect the applied pressure directly. But in most solutions with active pens, the pen comprises a pressure sensor detecting the pressure applied on the tip and sends the detected pressure back to the touch device. However, the state of the art solutions for pressure sensors have several drawbacks.

The pressure sensors necessitate movable parts, springs and often an electrical connection of the movable parts to a printed circuit board. This increase the time for assembling the pen, complexity of the construction and robustness.

The force applied on an active pen, in particular during drawing or writing interaction, can vary from tiny forces to very high forces. This increases the difficulty to detect the applied tip force with a high accuracy.

One problem is the normal use of spiral spring or other elastic elements which have a constant stiffness. Therefore, a certain change of the force applied on the tip causes the same displacement of the tip for weak and for strong forces. Since the displacement of the tip is only minimal, a realization can therefore either detect small forces with high accuracy, but not detect higher forces above a certain threshold anymore or detect a high range of forces up to high application forces with a low accuracy. Since both alternatives are not satisfactory, some solutions provide two springs with different stiffness such that the spring with a small stiffness is dominant for weak forces and the second spring with a high stiffness is dominant for high forces to extend the range of forces detectable with the pressure sensor. However, such a solution increases the complexity, size and robustness of the pressure sensor. Spiral springs have further the problem that they are difficult to assemble and need much space.

Therefore, it is an object to provide an active position indicator with a pressure sensor overcoming the mentioned problems.

It is an object to provide an active position indicator with a pressure sensor with reduced time for assembling the pen, reduced complexity of the construction and increased robustness.

It is an object to provide an active position indicator with a low complexity pressure sensor with a high force detection range with high accuracy at low forces.

BRIEF SUMMARY OF THE INVENTION

In one embodiment, these aims are achieved by means of the independent claims.

In one embodiment, these aims are achieved by an active position indicator, a method and a system according to the independent claims.

Leaf springs have the big advantage that they are easy to produce from one leaf material and can be highly adapted to the requirements like form, size, stiffness, stiffness's depending on the tip displacement. In addition, leaf spring can create an easy contact to the movable tip displacement.

The dependent claims refer to further advantageous embodiments.

In one embodiment, the position indicator comprises a position signal circuit connected with said movable tip element and configured to generate an indicator position signal for electric coupling with a touch device over the tip, wherein the elastic element is electrically conductive and the position signal circuit is electrically connected over said elastic element with said movable tip element.

This has the advantage that the element for contacting and the elastic element for acting against the force of the tip can be combined. This saves place and avoids the problematic to contact a movable element.

In one embodiment, the elastic element is non-linear with a stiffness depending on the tip displacement.

A non-linear spring has the advantage that a certain change of the force at small forces can cause larger changes of the tip displacement than larger changes of the tip displacement than the certain change of the force at a higher force.

BRIEF DESCRIPTION OF THE DRAWINGS

The invention will be better understood with the aid of the description of an embodiment given by way of example and illustrated by the figures, in which:

FIG. 1 shows a three-dimensional view of an embodiment of an active pen;

FIG. 2 shows a three-dimensional view of the embodiment of FIG. 1 without the outer housing;

FIG. 7 shows a three-dimensional view of the capacitive element of the force sensor of FIG. 3 with the first capacitor plate and the second capacitor plate being in the initial position;

FIG. 8 shows a top view of the capacitive element of the force sensor of FIG. 3 with the first capacitor plate and the second capacitor plate;

FIG. 9 shows a three-dimensional view of a housing of the force sensor of FIG. 3 with a spring;

FIG. 10 shows a top view of the housing of the force sensor of FIG. 3 with the spring;

FIG. 11 shows a three-dimensional view the spring of FIG. 9;

FIG. 12 shows first side view the spring of FIG. 9;

FIG. 13 shows a second side view the spring of FIG. 9;

FIG. 13A shows a top view of an alternative embodiment of the spring;

FIG. 13B shows a side view of the alternative embodiment of the spring of FIG. 13A;

FIG. 13C shows a production stage of the alternative embodiment of the spring of FIG. 13A; and FIG. 14 shows the capacitance value of different capacitive elements over the force applied on the tip 3 (with an elastic element with a constant stiffness).

DETAILED DESCRIPTION OF POSSIBLE EMBODIMENTS OF THE INVENTION

Figure 3:
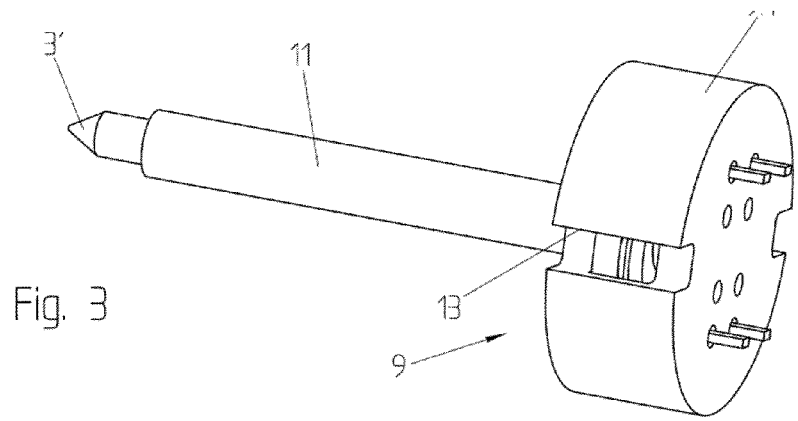
FIG. 3 shows a three-dimensional view of an embodiment of a force sensor for an active pen.
Figure 4:
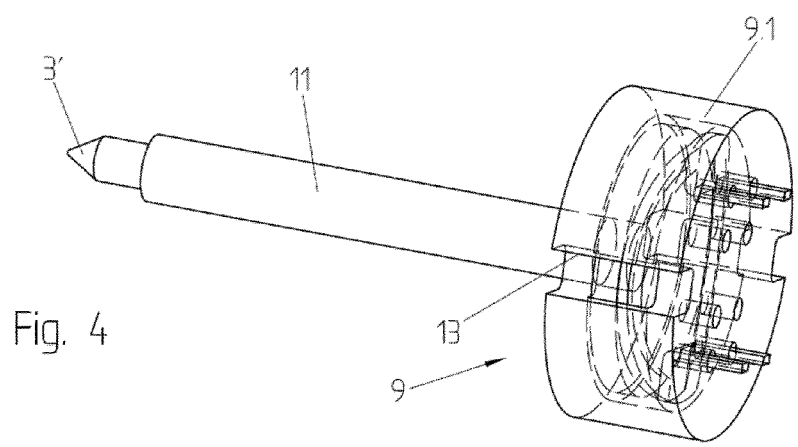
FIG. 4 shows a three-dimensional view of the force sensor of FIG. 3 with a transparent housing of the force sensor.
Figure 5:
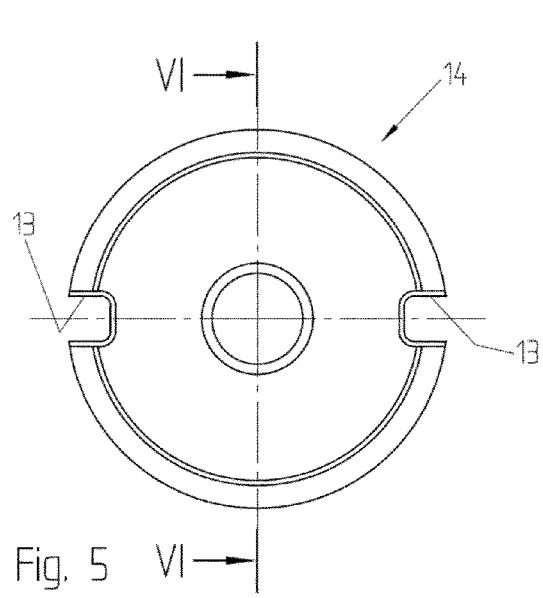
FIG. 5 shows a top view of a second capacitor plate of a capacitive element of the force sensor of FIG. 3.
Figure 6:
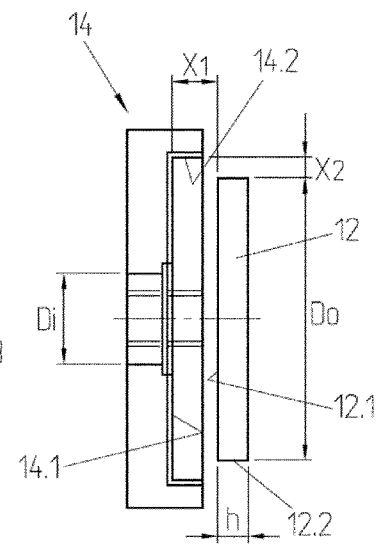
FIG. 6 shows a cross-section view of the capacitive element of the force sensor of FIG. 3 with a first capacitor plate and the second capacitor plate.

FIGS. 1 to 13 show an embodiment of an active pen 5. Everything disclosed with the following active pen is applicable for all other types of active position indicators.

The active pen 5 comprises a pen housing 6, a battery 7, a printed circuit board 8, a force sensor and a tip element 10 with a tip 3.

The pen housing 6 preferably encloses the battery 7, the printed circuit board 8 and a force detection mechanism 9 of the force sensor. The pen housing 6 preferably has an opening for comprising the tip element 10 such that the tip 3 is arranged outside of the housing 6 and connected via a rod 11 of the tip element 10 with the inner volume of the housing 6. Preferably the opening in the housing 6 guides the rod 11 of the tip element 10 such that the tip element 10 can (only) be moved in a displacement direction. However, it is also possible to detect the force in different directions. Preferably, the housing 6 has a cylindrical shape and the displacement direction is parallel to the longitudinal cylinder axis. Per definition the side/end of the active pen 5 with the tip 3 is named distal side/end and the opposed side/end of active pen 5 in the displacement direction is called proximal side/end. In the shown embodiment, the housing 6 comprise a tubular part 6.1 with the battery 7, the printed circuit board 8 and the force detection mechanism 9, a conical part 6.2 with said opening and the tip element 10 and a cap 6.3. The tubular part 6.1 comprises further a power button 6.4 configured to interact with a power switch 8.1 on the printed circuit board 8. The conical part 6.2 is attached with its proximal end to the distal end of the tubular part 6.1. The distal end of the conical part 6.2 comprises the opening for the tip element 10. Preferably, the conical part 6.2 has a conical shape becoming thinner from the proximal to the distal end. The proximal end of the tubular housing 6.1 is attached to the cap 6.3 closing the housing 6 on the proximal end. In a preferred embodiment, the cap 6.3 should be detachable, e.g. by a clip or thread mechanism, for exchanging the battery 7. In addition, the cap 6.3 should generate a necessary contact pressure to connect the battery terminals to the power supply terminals of the printed circuit board 8.

The shown embodiment of the active pen 5 works with the battery 7 as a power supply. However, any other means for supplying the necessary power can be used alternatively. For example, the battery 7 could be replaced by an energy harvesting mechanism for harvesting energy from the ambience, e.g. from light, temperature, electromagnetic waves (e.g. received from a touch device), electric coupling (e.g. with a touch device), movement of the pen, etc.

The printed circuit board 8 comprises in this embodiment all or at least most of the electronic circuitry of the active pen 5. The printed circuit board 8 has a longitudinal axis parallel to the longitudinal axis of the active pen 5 or of the tubular part 6.1 of the pen housing 6. The largeness of the printed circuit board 8 corresponds in one embodiment the inner diameter of the pen housing 6, in particular of the tubular housing 6.1. In the shown embodiment, the printed circuit board 8 is hold by or holds at a distal end the force detection mechanism 9 and/or at a proximal end one of the power supply terminals 8.3 of the printed circuit board 8. A housing 9.1 of the force detection mechanism and/or the power supply terminal 8.3 has/have a cylindrical form corresponding to the inner form of the hollow cylinder provided by the housing 6 such that the printed circuit board 8 is additionally fixed via the housing 9.1 of the force detection mechanism 9 and/or the power supply terminal 8.3 in all radial directions. However, the printed circuit board 8 could alternatively or additionally also be fixed directly in the housing 6, e.g. by rails for the printed circuit board 8. The printed circuit board 8 forms two arms 8.2 at its distal end configured to hold the housing 9.1 of the force detection mechanism 9. The arms are arranged at the lateral sides of the printed circuit board 8 with a thickness to be resistant against the expected stress on the force detection mechanism housing 9.1 in order to allow a maximal space between the two arms 8.2. The housing 9.1 could comprise two recesses 13 (shown e.g. in FIGS. 3 to 5 and 7 to 10) configured to receive the two arms 8.2 of the printed circuit board 8. Preferably, the dimensions of the arms 8.2 and the recesses 13 are designed such that the arms 8.2 fill out the recesses 13 such that the housing 9.1 cannot move in the radially to the displacement direction of the tip 3. Preferably, the lateral surface of the housing 9.1 (surface normal radial to longitudinal axis of the housing 6) is flush with the lateral surface of the printed circuit board 8. The distal ends of the arms 8.2 could comprise hooks in order to fix the housing 9.1 in a longitudinal direction of the printed circuit board 8 and in order to realize a snap fit fixation. However, also other fixations are possible.

The printed circuit board 8 preferably comprises a position signal circuit for generating and outputting a pen position signal. The pen position signal is preferably a periodic signal, e.g. a sinusoidal and/or cosinusoidal signal, with a certain frequency suitable for being transmitted to and detected at a touch device. Such a position signal circuit could for example comprise an oscillator and an amplifier. The output of the position signal circuit is preferably connected to at least one output terminal of the printed circuit board 8. The output terminal of the printed circuit board 8 is preferably conductively connected to the tip 3 for applying the generated pen position signal on the tip 3. The pen position signal applied on the tip 3 creates an electric coupling with a touch device. Such a coupling is preferably a capacitive coupling and/or an inductive coupling, but could be also the emission of a free electronmagnetic wave which could be received at the touch device. Preferably, the output terminal is conductively connected to a conductive elastic element holding the tip element 10 in its initial position, e.g. a metallic spring, which is conductively connected to the tip element 10. This solves the problem of contacting the movable tip element 10 to the fixed printed circuit board 8.

Preferably, the printed circuit board 8 comprises a force detection circuit of the force sensor for detecting the force applied on the tip 3 on the basis of the electronic feedback signal received from the force detection mechanism 9. Preferably, the input of the force detection circuit is conductively connected with at least one feedback input terminal of the printed circuit board 8. Preferably, the at least one input terminal of the printed circuit board 8 is arranged on at least one of the two arms 8.2 configured to contact the feedback terminal of the force detection mechanism 9. Therefore, at least one of the recesses 13 comprises a conductive surface which is in conductive contact with a conductive surface of the at least one arm 8.2 comprising the at least one feedback input terminal. Preferably, there are two input terminals for the feedback signal of the force detection mechanism 9, one on each of the two arms 8.2 of the printed circuit board 8. In the shown embodiment, the force detection mechanism 9 comprises a variable capacitive element with a capacitance value depending on the tip displacement (described below). In the shown embodiment, the pen position signal is fed to a second capacitor plate 12 of the capacitive element and a feedback signal is led from a first capacitor plate 14 of the capacitive element to the force detection circuit. Since the pen position signal has a fixed or at least a known frequency, the complex resistivity of the path from the second capacitor plate 12 to the force detection circuit depends only on the capacitance value of the capacitive element. Therefore, the feedback signal allows to determine the capacitance value of the capacitive element which itself depends only on the tip displacement. The force detection circuit preferably measures a value for the complex resistivity provided by the capacitive element which can be processed to a value for the force, e.g. by a look-up table. One example for determining the complex resistance could be determined e.g. by a rectifying and low-pass filtering the feedback signal. This results in a value for the amplitude of the feedback signal which gives a measure for the complex resistance. Instead of the pen position signal, it is also possible to use another signal applied over the capacitive element in order to detect the capacitance value. However, also other measurement methods for the capacitance value or for any other electronic value depending on the tip displacement can be determined and/or translated into a force value in the force detection circuit.

The printed circuit board 8 could further comprise a force data transmission circuit for transmitting the detected force (force data) acting on the tip 3 to a touch device. In one embodiment, the force data transmission circuit is connected to the tip 3 for transmitting the force data to the touch device by the electric coupling of the tip 3 with the touch device. The force data could be transmitted between the periods of the pen position signal and/or the force data could be modulated continuously or in data transmission windows on the pen position signal. Here different modulations like frequency, amplitude or other modes of modulation could be used. In another embodiment, the force data transmission circuit is connected to antenna (not the tip 3) for transmitting the force data to the touch device. In a further embodiment, the force data could be transmitted by a wired connection to the touch device.

The invention is however not restricted to a printed circuit board 8. Also other circuit boards or other realizations of electronic circuitry could be used to implement the electronic functionalities of the active pen.

The tip element 10 comprises at a distal end the tip 3 and at a proximal end the first capacitor plate 12 of the capacitive element. The first capacitor plate 12 is also part of the force detection mechanism 9 described later in more detail. The tip 3 and the first capacitor plate 12 are connected by the rod 11. The tip 3 comprises a conductive material for emitting the pen position signal received from the position signal circuit. In the shown embodiment, the tip 3 has a conductive core 3', preferably metal core, shown in FIGS. 3 and 4, which is then covered by a protective cap which is configured to make the emitted pen position signal pass and/or configured to avoid any damaging of a touch screen. Preferably, also the rod 11 comprise/is made of a conductive material, preferably metal, in order to lead the pen position signal to the tip 3. In an alternative embodiment, the rod 11 is made of a non-conductive material and comprises a conductor for leading the pen position signal from the position signal circuit to the tip 3. Such a conductor could be a conductive core of the rod 11. Preferably, also the first capacitor plate 12 is made of a conductive material, preferably metal. However, it is also possible to make the first capacitor plate 12 out of a non-conductive material with a metal coating/surface for at least a capacitor surface of the capacitive element of the force detection mechanism 9 described later. The tip element 10 is movably supported such that the tip element 10 can be moved at least in one displacement direction. The support can be provided by the housing 6, e.g. by the opening of the housing 6 and/or by the force detection mechanism 9. The tip element 10 is arranged such that it is in an initial position, if there is no force applied on the tip 3. The tip element 10 is arranged further such that it is displaced from the initial position by a tip displacement depending on a force applied on the tip 3. The active pen 5 could provide a maximum stopper element for the tip element 10 limiting the tip displacement to a maximum tip displacement. Such a maximum stopper element could be provided in the housing 6 or in the force detection mechanism 9.

The force detection mechanism 9 comprises the capacitive element with the capacitance value depending on the tip displacement and an elastic element for holding the tip element 10 in the initial position and/or for acting against a force applied on the tip 3 in the displacement direction.

In the shown embodiment, the capacitive element comprises the first capacitor plate 14 and the second capacitor plate 12. The first capacitor plate 14 is preferably fixed relative to the pen housing 6 and/or relative to the housing 9.1 of the force detection mechanism 9, while the second capacitor plate 12 moves depending on the tip displacement. Alternatively, it could be vice versa, important is that there is a relative movement of the first and second capacitor plate 14 and 12 relative to each other. In the shown embodiment, the second capacitor plate 12 is arranged such that second capacitor plate 14 is arranged in the initial position of the tip element 10 in a minimal distance to the first capacitor plate 14 and that the distance between the first and second capacitor plates 14 and 12 increases linearly with the tip displacement. In the shown embodiment, the minimal distance is zero such that the first and second capacitor plates 14 and 12 are conductively connected and that the initial position of the tip element 10 is easily detectable. However, it is also possible that the minimal distance between the capacitor plates is unequal zero. This avoids a short circuit with an increased power consumption. This can also be used to regulate the capacitance value behaviour of the capacitive element, because it decreases the initial value of the capacitance value at the initial position of the tip 3 (This increases the linear behaviour of a capacitive element, if there is a further capacitive portion with linear behaviour as described later). Between the first capacitor plate 14 and the second capacitor plate 12 could be arranged an insulating or dielectric material for realizing the non-zero initial distance between the two capacitor plate 12 and 14. This could be realized by coating the surface 12.1 or 12.2 by an insulator or dielectric coating. In one embodiment, the first capacitor plate 14 is arranged at a distal side (closer to the tip 3) and the second capacitor plate 12 is arranged at a proximal side (farer away of the tip 3). This can be realized by guiding the rod 11, preferably centrally, through the first capacitor plate 14.

In one embodiment, the capacitive element has a capacitive value depending on the tip displacement d. The capacitive value C of the capacitive element is calculated on the basis of a capacitor surface A of the capacitive element and a capacitor distance x of the capacitive element. In the case that the capacitance element is given by two parallel plane surfaces with the capacitor surface A and capacitor distance x, the capacitance value is proportional to the capacitor surface A divided by the capacitor distance x, i.e. A/x.

In a first embodiment of the capacitive element, the capacitor plates have opposing and overlapping metallic surfaces on the plate surfaces $A_1$ with a normal being parallel to the displacement direction of the tip 3 with a capacitor distance $x_1$ being equal or direct proportional to the tip displacement d. This results in a capacitance value $C_1$ direct proportional to inverse of the tip displacement 1/d. Since the complex resistivity $Z_1$ is direct proportional to the inverse of the capacitance value, the complex resistivity will be linear proportional to d in this case. However, this has the disadvantage that the small tip displacements d can be detected with the same absolute error as large tip displacements d. However, for small tip displacements d the relative error will therefore be larger and such a solution is not desirable, since it is desired to have a higher sensitivity for small tip displacements. FIG. 14 shows the capacitance value of different capacitive elements over the force applied on the tip 3 (with an elastic element with a constant stiffness). The functions 18 and 20 show a capacitive element according to the first embodiment with a capacitor surface $A_1$ provided by a ring with an outer diameter $D_o$ and an inner diameter $D_i$. The function 18 corresponds to a diameter relation of $D_i/D_o=0.3$ and the function 20 corresponds to a diameter relation of $D_i/D_o=0.9$. While the functions 18 and 20 have a steep gradient for small forces/tip displacements, their gradients become always more flat for increasing forces/tip displacements such that the detection error for high forces becomes very high.

In a second embodiment of the capacitive element, the capacitor plates have opposing metallic surfaces on the plate surfaces with a normal being rectangular to the displacement direction of the tip 3 with a capacitor surface $A_2$ being equal or direct proportional to the tip displacement d. The two surfaces of the two plates are arranged such that the overlapping capacitor surface $A_2$ would increase or decrease linearly with the tip displacement d while the distance $x_2$ remains constant. This results in a capacitance value $C_2$ direct proportional to the tip displacement d. Since the complex resistivity $Z_2$ is direct proportional to the inverse of the capacitance value, the complex resistivity will be linear proportional to 1/d in this case. Therefore, small changes at small tip displacements can be detected due to higher capacitance value changes much more exact than at large tip displacements. However, also this approach has a drawback, because now the quality for detecting changes at large tip displacements d can be detected only with a large error due to the almost flat behaviour of the capacitance value.

A third embodiment of the capacitive element combines now both advantages to achieve a behaviour of the capacitance value over the tip displacement d which changes at small tip displacements faster than at high tip displacements d, but does not have the negative effects of the second embodiment of the capacitive element. This is achieved by a capacitive element whose capacitor surface and capacitor distance change both depending on the tip displacement d. Such a realization is shown in the active pen 5. Therefor, the first capacitor plate 12 comprises a lateral conductive plate surface 12.2 with a surface normal being rectangular to the tip displacement (pointing versus the external of the active pen) and an axial conductive plate surface 12.1 with a surface normal being parallel to the tip displacement, preferably in the direction of the tip 3 (distal direction). The second capacitor plate 14 is formed as a hollow cylinder with the conductive plate surface on the inner side of the ground and side surface of the hollow cylinder. The second capacitor plate 14 of the capacitive element comprises also a lateral plate surface 14.2 with a surface normal extending rectangular to the displacement direction (pointing versus the centre of the active pen 5, i.e. opposing the lateral conductive plate surface 12.2) and an axial plate surface 14.1 with a surface normal parallel to the displacement direction, preferably in the direction away from the tip 3 (proximal direction), i.e. opposing the axial plate surface 12.1 of the first capacitor plate). In the shown embodiment, the second capacitor plate 14 is formed by the housing 9.1 which has a metallic coating on the inner wall of the housing 9.1 to realize the capacitor surface. The capacitive element can now be divided in a first capacitive portion with a first capacitor surface $A_1$ and a first capacitor distance $x_1$ and a second capacitive portion with a second capacitor surface $A_2$ and a second capacitor distance $x_2$. The first capacitive portion has a behaviour as described in the first embodiment with the first capacitor distance $x_1$ depending on the tip displacement d. The second capacitive portion has a behaviour as described in the second embodiment with the second capacitor surface $A_2$ depending on the tip displacement d. Considering that the axial conductive plate surface 14.1 and the lateral conductive plate surface 14.2 of the first capacitor plate 14 are on the same electric potential and the axial conductive plate surface 12.1 and the lateral conductive plate surface 12.2 of the second capacitor plate 12 are on the same electric potential, the first capacitive portion and the second capacitive portion can be considered as a parallel circuit of $C_1=k_1A_1/x_1(d)$ and $C_2=k_2A_2(d)/x_2$, with $k_1$ and $k_2$ being a constant depending on the electric constant $\varepsilon_0$ and the relative static permittivity of the material between the capacitor plates 12 and 14. Therefore, the capacitive element has a capacitance value $C=C_1+C_2=k_1A_1/x_1(d)+k_2A_2(d)/x_2$. The capacitive element combines the advantages of the behaviour of a capacitive element with a capacitor distance depending on the tip displacement and a capacitive element with a capacitor surface depending on the tip displacement. The capacitor surface of the shown embodiment is therefore the axial conductive plate surface 14.1 of the first capacitor plate 14 overlapping the axial conductive plate surface 12.1 of the second capacitor plate 14 (($D_o$-$D_i$)$^2\pi$) plus the lateral conductive plate surface 14.2 of the first capacitor plate 14 overlapping the lateral conductive plate surface 12.1 of the second capacitor plate 14 (around $2\pi D_o$(h−d)), wherein only the latter changes in dependence of the tip displacement. The capacitor distance of the capacitive element comprises an axial capacitor distance $x_1(d)$ and a lateral capacitor distance $x_2$, wherein (only) the first changes in dependence of the tip displacement d. Preferably, the distance between the lateral conductive plate surface 14.2 of the first capacitor plate 14 and the lateral conductive plate surface 12.2 of the second capacitor plate 12 remains constant with respect to the tip displacement d and/or the axial conductive plate surface 14.1 of the first capacitor plate 14 overlapping the axial conductive plate surface 12.1 of the second capacitor plate 12 remains constant with respect to the tip displacement d. The functions 17 and 19 show a capacitive element according to the third embodiment with a capacitor surface $A_1$ provided by a ring with an outer diameter $D_o$ and an inner diameter $D_i$. The function 17 corresponds to a diameter relation of $D_i/D_o$=0.3. The function 19 corresponds to a diameter relation of $D_i/D_o$=0.9. Both functions 17 and 19 correspond to the same height h. While the functions 17 and 19 keep the advantageous steep gradient for small forces/tip displacements, their gradients for high forces/tip displacements become linear, so that also for high tip displacements, the tip displacement can be determined with a certain desired constant error.

The distances $x_1$ and $x_2$ shall only indicate a distance without any limitation to the direction of their corresponding distance vectors. In the shown embodiment, the distance vectors are rectangular to each other, but any other arrangement like parallel or with other angular orientations is possible.

The shown embodiment is only one example for a capacitive element changing its capacitor surface and its capacitor distance in relation to the tip displacement d. For example this could be also realized by one single capacitor portion with two (preferably parallel) plate surfaces with a surface normal having an angle between 1° and 89° or 91° and 179°, respectively, to the tip displacement so that a change of the tip displacement d changes the capacitor distance and the overlapping capacitor surface of such an capacitive element. It is also possible to realize any other capacitive element whose effective capacitor surface changes and whose effective capacitor distance changes with the tip displacement.

However, it is in another embodiment also possible to realize the capacitive element with a capacitor plate connected to the tip element 10 being on a distal side and a fixed capacitor plate on a proximal side of the active pen with a distance between the capacitor plates becoming smaller with increasing tip displacements.

Even if the first and second capacitor plates are called plates, this shall not limit the form of the plates to linear and/or plane capacitor surfaces on the capacitor plates. One or both of the plates can have curved, circular, ellipsoidal, triangular, n-angular capacitor surfaces. Even if in all described embodiment, the capacitor surfaces of the plates are arranged parallel, this shall not be limitative and also capacitor plates with angular arrangements might be possible.

Alternatively, the force detection mechanism 9 could also use other converting means to convert the tip displacement in an electric signal indicating the tip displacement, e.g. an inductive element with an inductance value depending on the tip displacement.

The elastic element of the force detection mechanism 9 is a leaf spring. The elastic element is configured to apply a force on the tip element 10 acting against (compensating) a force applied on the tip 3 over the force measurement range of the force sensor. Therefore, the force detected by the force sensor is equal or at least linear proportional to the force of the elastic element on the tip element 10 at the detection time. In other words, for different forces of the elastic element on the tip element 10 (corresponding to different tip displacements), different forces are measured with the force sensor. This holds over the complete force detection range of the force sensor.

In the shown embodiment, the elastic element is a leaf spring 15 as shown in FIGS. 4, 9, 10, 11, 12 and 13. The leaf spring 15 has preferably a ring shaped form, wherein two ring segments of the leaf spring 15 form elastic leaf portions 15.1, while two other ring segments remain flat in order to form fixing portions 15.2 for the leaf spring 15. Preferably, the leaf spring 15 viewed from the side of one of the fixing portions 15.2 forms a trapezoid with the elastic leaf portions 15.1 forming the legs or the lateral sides of the trapezoid as shown in FIG. 12. In other words, the elastic leaf portions 15.1 are bend/formed upwards (in the tip displacement direction) such that the leaf spring 15 has an elastic behaviour in the direction of the tip displacement. The leaf spring 15 is configured to be formed out of one single leaf, e.g. metal plate, e.g. by stamping a ring out of one single leaf and bending/forming two ring segments in a direction of the surface normal of the leaf surface (ring centre axis). In one embodiment, the elastic leaf portions 15.1 are symmetric to a line through the two fixing portions 15.2, i.e. corresponding to an isosceles trapezoid. However, the leaf spring 15 could also be non-symmetric. The leaf spring 15 could also comprise only one or more than two elastic leaf portions 15.1. However, the leaf spring 15 could also have no fixing portions 15.2 and/or the elastic leaf portions 15.1 could also have other side-view shapes, e.g. triangular (without fixing portion 15.2), rounded elastic leaf portions (e.g. ellipsoidal, polygonal, polynomial, circular, etc.), etc. The ring-shape in the shown embodiment is circular, but also other ring-shapes like ellipsoidal, triangular, rectangular, quadratic, n-angular, etc. is possible. The leaf spring 15 could alternatively also be non-ring shaped, preferably also with two or more leaf portions. The leaf portions could e.g. be formed by leaf fingers or triangles.

The fixing portions 15.2 are fixed on the housing 9.1 by fixing members 15.3 which are formed by leaf fingers bend rectangular to the fixing portion 15.2. The fixing members 15.3 are also configured to be formed out of the same single leaf as the elastic leaf portions 15.1 and/or the fixing portions 15.2. Those fixing members 15.3 are inserted in holes 16 of the housing 9.1. The holes 16 are arranged in the proximal ground plane of the hollow cylinder formed by the housing 9.1. Therefore, fixing portion 15.2 will be supported by the proximal inner ground plane of the housing 9.1 of the force detection mechanism 9. The elastic leaf portions 15.1 are supported by the second capacitor plate 12 under tension so that the elastic leaf portions 15.1 press the tip element 10 with a small initial force in the initial position. When the force on the tip 3 exceeds the initial force, the tip element 10 moves in the displacement direction against the force of the leaf spring 15. The initial force is very small or zero. Preferably, the leaf spring 15 is conductive, e.g. made out of metal, and contacted to the printed circuit board 8 via the housing 9.1. This could be realized over the holes 16 being in contact with the fixing members 15.3 or via the inner ground plane of the housing 9.1 and the fixing portions. However, other contacting methods are possible. It is also possible to fix the fixing portions 15.1 on the second capacitor plate 12 and the elastic leaf portions 15.1 on the housing 9.1. The present solution has the advantage that the elastic element is used as contact mechanism to the tip element 10 for the pen position signal and at the same time as elastic element for the force detection mechanism. By supporting the elastic element in the housing 9.1 of the force detection mechanism 9, the force on the tip 3 is transferred on the housing 9.1 of the force detection mechanism 9, which transfers the force over the complete distal side of the printed circuit board 8 and/or to the pen housing 6. Therefore, this solution uses on the one side the elastic element to contact the tip element 10 with the printed circuit board 8 without transferring the force only on the output terminal of the printed circuit board 8 of the pen position signal, but rather on the complete side of the printed circuit board 8 and/or on the pen housing 6. Therefore, damages on the printed circuit board 8 are effectively omitted.

The housing 9.1 is preferably formed of a distal half shell 9.11 and a proximal half shell 9.12. The distal half shell 9.11 shown in FIGS. 7 and 8 comprise the first capacitor plate 14 and guide the rod 11 of the tip element 10. The proximal half shell 9.12 supports the elastic element so that the force of the elastic element acts against the tip displacement of the tip element 10. The distal half shell 9.11 and the proximal half shell 9.12 form together a hollow cylinder. The distal half shell 9.11 and the proximal half shell 9.12 are preferably hold together by the arms 8.2 of the printed circuit board 8. This arrangement allows to open the housing 9.1 for assembling the force detection mechanism 9 with the elastic element and the tip element 10.

The stiffness $S(d)$ of the elastic element preferably changes with the tip displacement $d$. This yields a non-linear elastic element with the force $F=-S(d)*d$. Preferably, the stiffness increases with increasing tip displacements. This includes either steadily increasing stiffness's or a step-wise increase, e.g. a low stiffness from the initial position to a first tip displacement and a second stiffness between the first tip displacement and a second or the maximal tip displacement. This allows to cause for smaller forces higher tip displacements, while the tip displacements at higher forces become smaller. This allows for the same maximal tip displacement to extend the detectable force range without reducing the sensibility at small tip displacements. However, it is also possible to use constant stiffness's $S$ with a linear elastic element yielding the force $F=-S*d$.

The stiffness of the leaf spring 15 depends on various parameters of the leaf spring, in particular the length or radius of the leaf portions, the angle $\alpha$, the thickness t of the elastic leaf portions 15.1 and/or the largeness L of the leaf portions 15.1. Those parameters can be chosen such that the leaf spring 15 shows a non-linear behaviour with stiffness depending on the tip displacement d. This could be realised by choosing those parameter different for the leaf portions such that at least two leaf portions have different (constant) stiffness' which lead combined to a non linear stiffness. In the shown embodiment, each of the two leaf portions could have another angle $\alpha$ and/or another length/radius. Therefore, at an initial position of the tip 3, only the first leaf portion with the larger angle $\alpha$ and/or larger length/radius would act against a force on the tip 3. The moment the tip element 10 is displaced by a first tip displacement, the tip element 10 would contact also the second leaf portion and the stiffness' of both leaf portions would sum up to an increased stiffness. Therefore, such an arrangement could realise a stiffness $S(d)$ having a step function. The moment of the step over the tip displacement can be regulated by the parameters of the leaf spring which cause the tip displacement necessary from the initial position to the first tip displacement, when the second leaf portion touches the tip element. The stiffness for tip displacements being smaller than the first tip displacement, can be controlled by the parameters of the first leaf portion, like the largeness and/or thickness t. The stiffness for tip displacements being larger than the first tip displacement, is the stiffness of both leaf portions together and can be controlled by the parameters of the second leaf portion, like the largeness and/or thickness t. Preferably the largeness and/or thickness of the second leaf portion is larger than in the first leaf portion. Multiple step functions (more than 1 step) could be realized by multiple leaf portions (more than 2). This can e.g. be realised by arranging three or more leaf portions, like leaf fingers or triangles, in the leaf spring. Each leaf portion could have another contact tip displacement, when the tip element 10 would contact the respective leaf portion. The leaf portions could be arranged in star(ring) form, if the leaf portions are triangles or fingers. It is however also possible to realise leaf springs with constantly varying stiffness over the tip displacement. This could for example be realized by a spiral leaf portion with an increasing largeness or thickness or another stiffness determining parameter from the first contact zone to the last contact zone.

FIGS. 13A and 13B show an alternative embodiment of a leaf spring 21 as an elastic element which could replace the leaf spring 15 in the previous Figures. Also in this embodiment, the leaf spring 21 has base portion 21.2 arranged in a first plane and at least one elastic leaf portion 21.1. Preferably the at least one elastic leaf portion 21.1 is cut out (except at the bending edge) from one single leaf material arranged in the first plane as shown in FIG. 13C. Preferably, the at least one elastic leaf portion 21.1 is then bended at the bending edge, such that the surface of the at least one elastic leaf portion 21.1 is arranged under at least one angle $\alpha$ to the first plane or to the surface of the base portion 21.2 as shown in FIG. 13A. Therefore, the end of (each of) the at least one elastic leaf portion 21.1 has a certain height over the base portion 21.2 or the first plane. The end of (each of) the at least one elastic leaf portion 21.1 and the base portion 21.2 is arranged between the tip element 10 (here the capacitor plate 12) and the housing of the pen (here the housing 9 of the force detection mechanism such that the force of the leaf spring 21 on the tip element 10 varies over the force sensor range for each tip displacement. Preferably, the at least one elastic leaf portion comprises a plurality of elastic leaf portions 21.1 (at least two). This allows realizing a spring with a large force range with a very small height. From a top view on the first plane, the leaf spring 21 has a centre C and a circumferential side. Preferably, each of the plurality of elastic leaf portions 21.1 is bended such that the bending edge is in the direction of the circumferential side of the leaf spring 21 and that the end of the elastic leaf portion 21.1 (having the mentioned height over the first plane) points to the centre C as seen in FIGS. 13A and 13B. Preferably, the elastic leaf portions 21.11 are cut out between the centre C and the bending edge from the leaf material as shown in FIG.

13C. The form of each of the elastic leaf portions 21.11 is triangular. Like this the largeness d of the leaf spring 21 can be maintained very small notwithstanding a large force range of the leaf spring 21. In the shown embodiment, the leaf spring 21 has a circumferential base portion 21.2 at which the elastic leaf portions 21.1 are arranged with the bending edge. Preferably, the plurality of elastic leaf portions 21.1 comprises at least one first elastic leaf portion 21.11 and at least one second elastic leaf portion 21.12. Preferably, the end of (each of) the at least one first elastic leaf portion 21.11 has a first height h1 and/or (each of) the at least one first elastic leaf portion 21.11 has a first stiffness. Preferably, the end of (each of) the at least one second elastic leaf portion 21.12 has a second height h2 and/or (each of) the at least one second elastic leaf portion 21.12 has a second stiffness. The first height h1 is larger than the second height h2. Preferably, but not necessarily, the first stiffness is smaller than the second stiffness. This allows realizing a leaf spring with a first spring stiffness (=number of first elastic leaf portions 21.11*the first stiffness) in a first compression range (<h1-h2) and a with a second harder spring stiffness (=number of first elastic leaf portions 21.11*the first stiffness+number of second elastic leaf portions 21.12*the second stiffness) in a second larger compression range (>h1-h2). The second spring stiffness is harder because the in addition to the at least one first elastic leaf portion 21.11 also the at least one second elastic leaf portion 21.12 acts on the tip element 10. This allows realizing a nonlinear leaf spring as described above with a step function. The different stiffness's of the first and second elastic leaf portion 21.11 and 21.12 can be realized by different form, here with different lengths of the bending edges a1 and a2. The leaf material is preferably a metal, e.g. copper or a metal containing copper like CuB2 (EN1654).

The described leaf spring 21 allows realizing a spring over the complete force range of the force sensor with very small dimensions. The spring 21 has preferably a height (h1) smaller than 3 mm, preferably smaller than 2 mm, preferably smaller than 1.5 mm. The spring 21 has preferably largeness (d) smaller than 15 mm, preferably smaller than 10 mm, preferably smaller than 8 mm. The largeness (c) of the circumferential base portion 21.2 between the bending edge and the circumferential edge is preferably smaller than 1 mm, preferably smaller than 0.6 mm, preferably smaller than 0.4 mm. The difference between the first height h1 and the second height is preferably smaller than 0.3 mm, preferably smaller than 0.2 mm, preferably smaller than 0.15 mm.

The force detection mechanism 9 and the force detection circuit form together the force sensor.

The described embodiment of the pressure sensor of the active pen 15 is in particular advantageous for active pens continuously emitting a pen position signal, i.e. not phase-synchronized with the touch device, as disclosed in WO2014/174123 which shall be incorporated by reference sign here. Such an active pen is in particular advantageous in combination with a touch device detecting the position of passive and continuously emitting active touches on a capacitive touch surface. Such touch devices are disclosed in WO2014/174123 and shall be enclosed by reference.

A preferable feature in this invention means that this is the best way to carry out the invention, but the feature can be replaced by any other feature within the scope of the claims. In other words the scope of protection is not restricted by the preferred feature, but can be performed in any other way.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. Active position indicator comprising:
a movable tip element configured to be displaced from an initial position in a displacement direction by a tip displacement depending on the force acting on a tip arranged on a distal end of the tip element;
a force sensor for detecting a force acting on the tip, wherein the force sensor comprises an elastic element acting on the tip element against the tip displacement and a converter means for converting the tip displacement of the tip element in an electrical signal by an electronic value depending in the detectable force range of the force sensor on the tip displacement;
wherein the elastic element is a leaf spring, wherein the leaf spring comprises at least two elastic leaf portions being elastic in the displacement direction and acting against the force on the tip, wherein the at least two elastic leaf portions comprises at least one first elastic leaf portion arranged to be in contact with the tip element for a first compression range of the leaf spring for small forces and at least one second elastic leaf portion arranged to be in contact with the tip element after the first compression range for a second compression range of the leaf spring for larger forces,
wherein the force sensor comprises a force detection mechanism housing and the leaf spring is arranged in the force detection mechanism housing between a housing wall and the tip element, wherein the tip element is led into the force detection mechanism housing, wherein the force detection mechanism housing has the form of a hollow cylinder with the tip element moving along the cylinder axis.

2. Active position indicator according to claim 1, wherein the leaf spring has a ring shape with the centre axis of the ring being parallel to the displacement direction and with at least one ring segment bended in the displacement direction forming each an elastic leaf portion.

3. Active position indicator according to claim 1, wherein the at least two elastic leaf portions are cut out from a leaf material as triangular pieces between a centre of the leaf material and a bending edge.

4. Active position indicator according to claim 1 comprising a position signal circuit connected over said leaf spring with said movable tip element and configured to generate an indicator position signal to be applied on the tip, wherein the leaf spring is electrically conductive.

5. Active position indicator according to claim 1, wherein the converter is a capacitive element with a capacitance value depending on the tip displacement.

6. Active position indicator according to claim 5, wherein the capacitive element comprises a capacitor distance depending on the tip displacement and a capacitor surface depending on the tip displacement, wherein the capacitance value of the capacitive element depends on the capacitor distance and on the capacitor surface.

7. Active position indicator according to claim 1, wherein the leaf spring is formed out of a leaf material, wherein the at least one first elastic leaf portion and the at least one second elastic leaf portion bent via a bending edge with a certain angle out of a leaf plane of the leaf material, wherein the bending edges of the at least one first elastic leaf portion and the at least one second elastic leaf portion is arranged in the leaf plane.

8. Active position indicator according to claim 1, wherein the leaf spring comprises a base portion in a first plane, wherein the at least one first elastic leaf portion is bent out of at least one first location of the base portion and the at least one second elastic leaf portion is bent out of at least one second location of the base portion.

9. Active position indicator according to claim 1, wherein at least one first elastic leaf portion is arranged to remain in contact with the tip element after the first compression range so that the stiffness of the at least first elastic leaf portion and the at least one second elastic leaf portion sum up for the second compression range of the leaf spring.

10. Method to detect a force on a tip of an active position indicator comprising the steps:
   detecting in the detectable force range of the method a tip displacement of the tip depending on the force on the tip;
   wherein a leaf spring is used to act against the tip displacement caused by the force applied on the tip, wherein the leaf spring comprises at least two elastic leaf portions being elastic in the displacement direction and acting against the force on the tip, wherein the at least two elastic leaf portions comprises at least one first elastic leaf portion arranged to be in contact with the tip element for a first compression range of the leaf spring for small forces and at least one second elastic leaf portion arranged to get in contact with the tip element after the first compression range for a second compression range of the leaf spring for larger forces, wherein the at least two elastic leaf portions are cut out from a leaf material as triangular pieces between a center of the leaf material and a bending edge.

11. A touch system comprising:
   an active position indicator configured to emit an indicator position signal of a tip;
   a touch device configured to detect the location of the tip of the active position indicator on the basis of the emitted indicator position signal,
   wherein the active position indicator comprises:
      a movable tip element configured to be displaced from an initial position in a displacement direction by a tip displacement depending on the force acting on a tip arranged on a distal end of the tip element;
      a force sensor for detecting a force acting on the tip, wherein the force sensor comprises an elastic element acting on the tip element against the tip displacement and a converter means for converting the tip displacement of the tip element in an electrical signal by an electronic value depending in the detectable force range of the force sensor on the tip displacement;
      wherein the elastic element is a leaf spring, wherein the leaf spring comprises at least two elastic leaf portions being elastic in the displacement direction and acting against the force on the tip, wherein the at least two elastic leaf portions comprises at least one first elastic leaf portion arranged to be in contact with the tip element for a first compression range of the leaf spring for small forces and at least one second elastic leaf portion arranged to get in contact with the tip element after the first compression range for a second compression range of the leaf spring for larger forces, wherein the at least two elastic leaf portions are cut out from a leaf material as triangular pieces between a center of the leaf material and a bending edge.

12. Active position indicator comprising:
   a movable tip element configured to be displaced from an initial position in a displacement direction by a tip displacement depending on the force acting on a tip arranged on a distal end of the tip element;
   a force sensor for detecting a force acting on the tip, wherein the force sensor comprises an elastic element acting on the tip element against the tip displacement and a converter means for converting the tip displacement of the tip element in an electrical signal by an electronic value depending in the detectable force range of the force sensor on the tip displacement;
   wherein the elastic element is a leaf spring, wherein the leaf spring comprises at least two elastic leaf portions being elastic in the displacement direction and acting against the force on the tip, wherein the at least two elastic leaf portions are cut out from a leaf material as triangular pieces between a center of the leaf material and a bending edge.

13. Active position indicator according to claim 12, wherein for each force of the leaf spring on the tip element, a different force acting on the tip element is measured with the force sensor.

14. Active position indicator according to claim 12, wherein the leaf spring is nonlinear and has a stiffness depending on the tip displacement.

15. Active position indicator according to claim 14, wherein the stiffness of the leaf spring increases with increasing tip displacement.

16. Active position indicator according to claim 12, wherein the leaf spring is formed out of a leaf material with at least one elastic leaf portion bent with a certain angle out of the leaf surface, wherein the leaf spring is arranged with the leaf surface normal of the leaf material parallel to the displacement direction and with the at least one elastic leaf portion being elastic in the direction of the displacement direction.

17. Active position indicator according to claim 12, wherein the leaf spring comprises fixing members made out of a leaf material of the leaf spring for fixing the leaf spring.

18. Active position indicator according to claim 12, wherein the at least one second elastic leaf portion has a larger stiffness than the at least one first elastic leaf portion.

19. Active position indicator according to claim 12, wherein each of the at least two elastic leaf portions is bended such that the bending edge is in the direction of the circumferential side of the leaf spring and that the end of the elastic leaf portion points to the centre of the leaf spring.

20. Active position indicator according to claim 12, wherein the force sensor comprises a force detection mechanism housing and the leaf spring is arranged in the force detection mechanism housing between a housing wall and the tip element, wherein the tip element is led into the force detection mechanism housing.

21. Active position indicator according to claim 20, wherein the force detection mechanism housing has the form of a hollow cylinder with the tip element moving along the cylinder axis.

* * * * *